US009330867B2

(12) United States Patent
Leusenkamp et al.

(10) Patent No.: US 9,330,867 B2
(45) Date of Patent: May 3, 2016

(54) VACUUM SWITCHING APPARATUS, AND ELECTRODE EXTENSION ASSEMBLY AND ASSOCIATED ASSEMBLY METHOD THEREFOR

(71) Applicant: EATON CORPORATION, Cleveland, OH (US)

(72) Inventors: Martin B.J. Leusenkamp, Suzhou (CN); Yucheng Li, Suzhou (CN); Xuefei Chen, Suzhou (CN); Lihua Bao, Suzhou (CN); Louis G. Campbell, Elmira, NY (US)

(73) Assignee: EATON CORPORATION, Cleveland, OH (US)

( * ) Notice: Subject to any disclaimer, the term of this patent is extended or adjusted under 35 U.S.C. 154(b) by 21 days.

(21) Appl. No.: 14/275,992

(22) Filed: May 13, 2014

(65) Prior Publication Data

US 2015/0332879 A1 Nov. 19, 2015

(51) Int. Cl.
*H01H 31/02* (2006.01)
*H01H 33/66* (2006.01)
*B23K 15/00* (2006.01)
*B23K 10/02* (2006.01)
*B23K 31/02* (2006.01)
*H01H 1/58* (2006.01)

(52) U.S. Cl.
CPC ............ *H01H 33/6606* (2013.01); *B23K 10/02* (2013.01); *B23K 15/0046* (2013.01); *B23K 31/02* (2013.01); *H01H 2001/5894* (2013.01); *Y10T 29/49107* (2015.01)

(58) Field of Classification Search
CPC .................. H01H 33/6606; H01H 2033/6623; H01H 9/0038; H01H 33/66
See application file for complete search history.

(56) References Cited

U.S. PATENT DOCUMENTS

| 3,244,842 A | * | 4/1966 | Kameyama | ............ H01H 33/32 218/118 |
| 4,650,939 A | * | 3/1987 | Milianowicz | ................. 218/118 |
| 4,707,577 A | * | 11/1987 | Tamaki | .............. H01H 33/6641 218/129 |

(Continued)

FOREIGN PATENT DOCUMENTS

| DE | 20 2006 007973 U1 | 8/2006 |
| EP | 2 690 641 A1 | 1/2014 |
| FR | 2 860 350 A1 | 4/2005 |

OTHER PUBLICATIONS

European Patent Office, "International Search Report and Written Opinion for PCT/US2015/023767", Jun. 25, 2015, 9 pp.

*Primary Examiner* — Truc Nguyen
(74) *Attorney, Agent, or Firm* — Eckert Seamans Cherin & Mellott, LLC; Grant E. Coffield

(57) ABSTRACT

An electrode extension assembly is for a vacuum switching apparatus, such as a vacuum interrupter, including a vacuum envelope and separable contact assemblies. Each contact assembly includes a contact disposed in the interior of the vacuum envelope, and an electrode stem extending outwardly from the contact to the exterior of the vacuum envelope. The electrode extension assembly includes a number of extension members each being be joined to the electrode stem of a corresponding one of the contact assemblies on the exterior of the vacuum envelope by a welded joint formed by electron beam welding or plasma welding.

19 Claims, 3 Drawing Sheets

(56) References Cited

U.S. PATENT DOCUMENTS

| | | | |
|---|---|---|---|
| 5,914,201 A * | 6/1999 | Hughett | H01M 2/0202 137/260 |
| 6,172,317 B1 | 1/2001 | Wristen | |
| 6,444,939 B1 | 9/2002 | Crookston et al. | |
| 8,575,509 B2 | 11/2013 | Marchand et al. | |
| 8,653,396 B2 | 2/2014 | Li et al. | |
| 9,006,600 B2 * | 4/2015 | Leusenkamp | H01H 9/52 218/118 |
| 2010/0230388 A1 * | 9/2010 | Tak | H01H 33/6644 218/123 |
| 2010/0270267 A1 * | 10/2010 | Noda | C22C 9/00 218/123 |
| 2013/0119021 A1 * | 5/2013 | Li | H01H 33/6645 218/124 |

* cited by examiner

VACUUM SWITCHING APPARATUS, AND ELECTRODE EXTENSION ASSEMBLY AND ASSOCIATED ASSEMBLY METHOD THEREFOR

BACKGROUND

1. Field

The disclosed concept relates to vacuum switching apparatus and, in particular, vacuum switching apparatus such as, for example, vacuum interrupters. The disclosed concept also relates to electrode extension assemblies and assembly methods for vacuum interrupters.

2. Background Information

Some circuit breakers such as, for example, power circuit breakers, employ vacuum interrupters as the switching devices. Vacuum interrupters generally include separable electrical contacts disposed on the ends of corresponding electrodes within an insulating housing. Typically, one of the contacts is fixed relative to both the housing and to an external electrical conductor, which is electrically interconnected with a power circuit associated with the vacuum interrupter. The other contact is part of a movable contact assembly including an electrode stem of circular cross-section and a contact disposed on one end of the electrode stem and enclosed within a vacuum chamber. A driving mechanism is disposed on the other end, external to the vacuum chamber. The electrodes are typically brazed or otherwise suitable joined together when the vacuum interrupter is made.

The external ends of the electrodes (i.e., electrode stems) are relatively limited in their capability for use in various different vacuum interrupter designs and ability to meet customer design requirements. Further, there are a number of potential problems associated with modifying electrode stems after the vacuum interrupter has been otherwise assembled (i.e., after the vacuum envelope has been sealed). For example, oxidation of the electrodes can occur, and/or a connection having undesirably low electrical and thermal conductivity or damage to the sealed vacuum envelope could result.

There is, therefore, room for improvement in vacuum switching apparatus, such as vacuum interrupters, and in electrode extension assemblies and associated assembly methods therefor.

SUMMARY

These needs and others are met by embodiments of the disclosed concept, which are directed to electrode extension assemblies and associated assembly methods for vacuum switching apparatus, such as vacuum interrupters.

As one aspect of the disclosed concept, an electrode extension assembly is provided for a vacuum switching apparatus. The vacuum switching apparatus includes a vacuum envelope and separable contact assemblies. The vacuum envelope has an interior and an exterior. Each of the contact assemblies includes a contact disposed in the interior and an electrode stem extending outwardly from the contact to the exterior. The electrode extension assembly comprises: a number of extension members each being structured to be joined to the electrode stem of a corresponding one of the contact assemblies on the exterior of the vacuum envelope.

Each of the extension members may be joined to the electrode stem by a welded joint. The welded joint may be formed by electron beam welding or plasma welding. The separable contact assemblies may comprise a fixed contact assembly and a movable contact assembly, and the number of extension members may be a first extension member and a second extension member, wherein the first extension member is welded to the electrode stem of the fixed contact assembly on the exterior of the vacuum envelope, and wherein the second extension member is welded to the electrode stem of the movable contact assembly on the exterior of the vacuum envelope.

Each of the electrode stems may be made from a first material, and at least one of the first extension member and the second extension member may be made from a second material, wherein the second material is different from the first material.

As another aspect of the disclosed concept, a vacuum switching apparatus comprises: a vacuum envelope having an interior and an exterior; separable contact assemblies each including a contact disposed in the interior and an electrode stem extending outwardly from the contact to the exterior; and an electrode extension assembly comprising: a number of extension members each being joined to the electrode stem of a corresponding one of the contact assemblies on the exterior of the vacuum envelope.

As a further aspect of the disclosed concept, a method of assembly comprises: providing a vacuum switching apparatus including a vacuum envelope and separable contact assemblies, the vacuum envelope having an interior and an exterior, each of the contact assemblies including a contact disposed in the interior and an electrode stem extending outwardly from the contact to the exterior, providing an electrode extension assembly comprising a number of extension members, and welding at least one of the extension members to the electrode stem of a corresponding one of the contact assemblies on the exterior of the vacuum envelope.

The welding step may further comprise employing electron beam welding or plasma welding to form the welded joint between each of the extension members and the electrode stem, and may still further comprise: employing a fixture to position the electrode extensions with respect to the electrode stems within a vacuum chamber, welding the electrode extensions to the electrode stems, and removing the welded assembly from the vacuum chamber.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
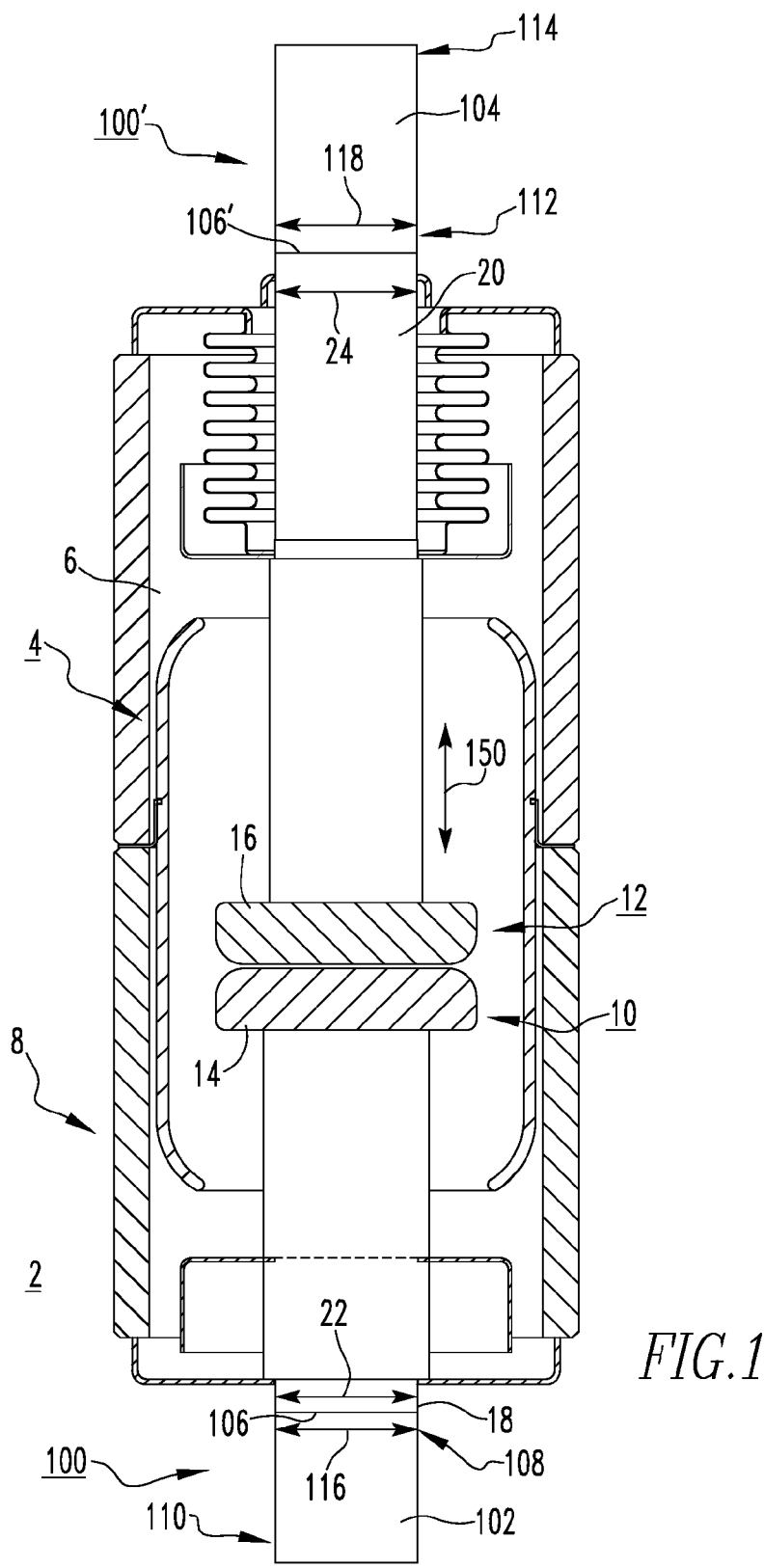
FIG. 1 is a section view of a vacuum interrupter and electrode extension assembly therefor, in accordance with an embodiment of the disclosed concept.

The disclosed concept is described in association with vacuum interrupters, although the disclosed concept is applicable to a wide range of contact assemblies for use with other vacuum switching apparatus and electrical switching apparatus.

Directional phrases used herein, such as, for example, up, down and derivatives thereof, relate to the orientation of the elements shown in the drawings and are not limiting upon the claims unless expressly recited therein.

As employed herein, the statement that two or more parts are "connected" or "coupled" together shall mean that the parts are joined together either directly or joined through one or more intermediate parts. Further, as employed herein, the statement that two or more parts are "attached" or "affixed" shall mean that the parts are joined together directly.

As employed herein, the term "vacuum envelope" means an envelope employing a partial vacuum therein.

As employed herein, the term "number" shall mean one or an integer greater than one (i.e., a plurality).

Referring to FIG. 1, a vacuum switching apparatus, such as a vacuum interrupter 2, is shown. The vacuum interrupter 2 includes a vacuum envelope 4, which is shown in section view in FIG. 1 to show hidden structures. The vacuum envelope 4 has an interior 6 and an exterior 8. The vacuum interrupter 2 employs separable contact assemblies 10,12. Specifically, a fixed contact assembly 10 includes a contact 14 disposed in the interior 6 of the vacuum envelope 4, and an electrode stem 18, which extends outwardly from the fixed contact 14 to the exterior 8 of the vacuum envelope 4. The movable contact assembly 12 also includes a movable contact 16 disposed on the interior 6 of the vacuum envelope 4, and a corresponding electrode stem 20 extending outwardly from the movable contact 16 to the exterior 8 of the vacuum envelope 4, as shown. The movable contact assembly 12 is movable, for example and without limitation, up and down in the direction of arrow 150, in order to move the movable contact 16 thereof into and out of electrical contact with the stationary contact 14 of the fixed contact assembly 10.

Figure 2:
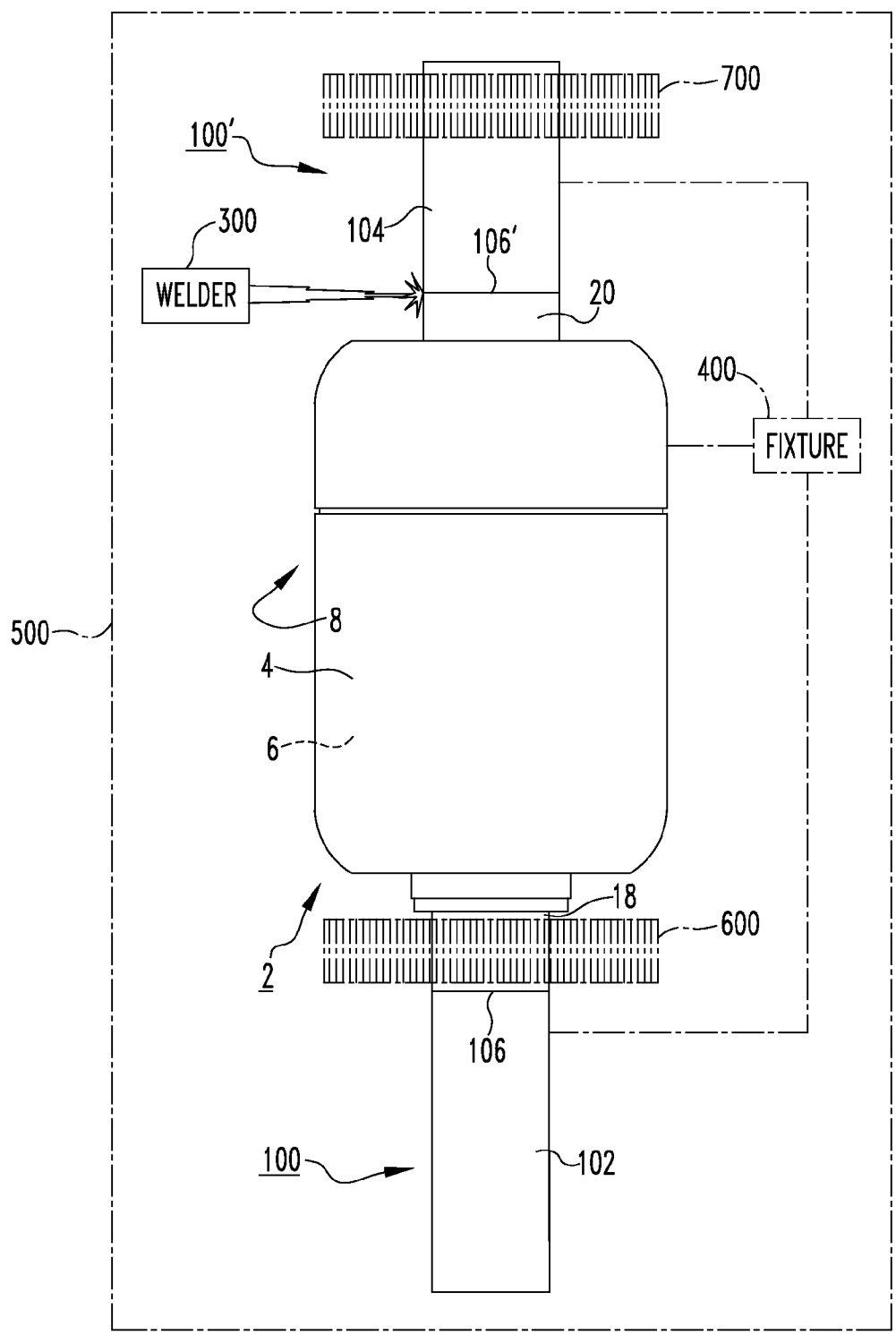
FIG. 2 is an elevation view of the vacuum interrupter and electrode extension assembly therefor of FIG. 1, also showing an assembly method in accordance with the disclosed concept.
Figure 3:
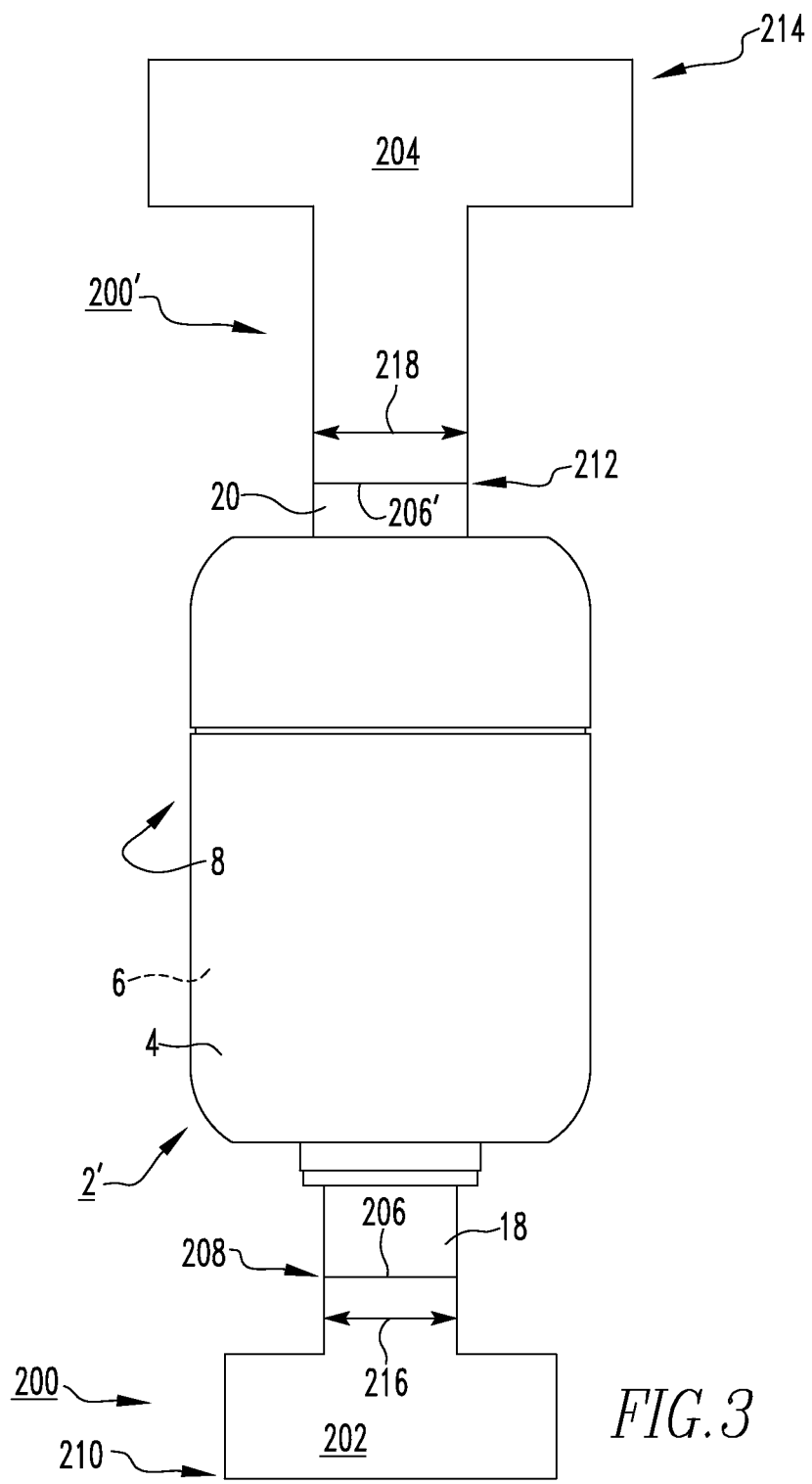
FIG. 3 is an elevation view of a vacuum interrupter and electrode extension assembly therefor, in accordance with another embodiment of the disclosed concept.

Continuing to refer to FIG. 1, and also to FIG. 2, in accordance with an embodiment of the disclosed concept, each contact assembly 10,12 further includes an electrode extension assembly 100,100' (see also electrode extension assemblies 200,200' of FIG. 3).

It will be appreciated that, for ease of illustration and economy of disclosure, only electrode extension assembly 100 (see also electrode extension assembly 100') is described, in detail herein, and is only described herein with respect to the vacuum interrupter 2, shown (see also vacuum interrupter 2' of FIG. 3). However, it will be understood that electrode extension assemblies (e.g., without limitation, 100,100',200, 200') in accordance with the disclosed concept, could be employed in any known or suitable combination or alternative arrangement (not shown) with any known or suitable alternative vacuum switching apparatus (not shown) and/or separable contact assemblies (e.g., without limitation, 10,12) therefor, without departing from the scope of the disclosed concept. For example and without limitation, electrode extension assemblies 100,100',200,200', could be employed with a vacuum switching apparatus having two movable contact assemblies (not shown) rather than the aforementioned arrangement of a fixed contact assembly 10 and a movable contact assembly 12.

Each of the electrode extension assemblies 100,100' includes an extension member 102,104 structured to be joined to a corresponding electrode stem 18,20 of a corresponding one of the contact assemblies 10,12, respectively, on the exterior 8 of the vacuum envelope 4. That is, in accordance with the disclosed concept, such extension members 102,104 are advantageously joined to the corresponding electrode stems 18,20, respectively, after the vacuum envelope 4 has been vacuumed sealed. In other words, the extension members 102,104 are joined on the exterior 8, or outside, of the vacuum envelope 4, as shown.

Among other advantageous, the electrode extension assemblies 100,100' (see also, electrode extension assemblies 200,200' of FIG. 3) allow for customization of the contact assemblies 10,12, to meet customer demands in new or existing applications and/or to relatively easily modify an existing vacuum interrupter 2. For example and without limitation, relatively complex geometries can be accommodated through use of the extension members 102,104 of the disclosed electrode extension assemblies 100,100'.

This, in turn, improves manufacturing efficiency by enabling the ability to relatively easily make a wide variety of different customized electrode configurations to an otherwise standard vacuum interrupter 2. It also enables the ability to attach a wide variety of alternative materials (e.g., without limitation, aluminum) to the electrode stems 18,20, at least some of which are not compatible with traditional vacuum brazing or other vacuum interrupter assembly processes. For example and without limitation, use of aluminum extension members 102,104 can advantageously reduce the total weight of the vacuum interrupter 2. A still further advantage is that extension members 102,104 which are, for example and without limitation, already silver plated, can be joined to the electrode stems 18,20. This significantly simplifies the silver plating process by allowing plating of loose or separate extension members 102,104, for example, before they are joined to the vacuum interrupter 2, rather than undergoing a more complex silver plating process that would be required if the electrode stems 18,20 and extension members 102,104, respectively, therefor, were plated after being attached to the vacuum interrupter 2.

The electrode extension assembly 100,100',200,200' of the disclosed concept and the advantages they afford will be further appreciated with reference to the following EXAMPLES, which will now be described with reference to FIGS. 1-3. It will be appreciated that the following EXAMPLES are provided solely for purposes of illustration, and are not intended to limit the scope of the disclosed concept.

EXAMPLE 1

Each of the extension members 102,104,202,204, may be joined to a corresponding electrode stem 18,20 by electron beam or plasma welding using a welder 300 (shown in simplified form in FIG. 2). A welded joint 106,106' (FIGS. 1 and 2), 206,206' (FIG. 3) may be formed by the welder 300 on the exterior 8 of the vacuum envelope 4.

EXAMPLE 2

Each electrode stem 18,20 may have a stem diameter 22,24. The first extension member 102 (FIGS. 1 and 2), 202 (FIG. 3) has first and second opposing ends 108,110 (FIGS. 1 and 2), 208,210 (FIG. 3), and the second extension member 104 (FIGS. 1 and 2), 204 (FIG. 3) has opposing first and second ends 112,114 (FIGS. 1 and 2), 212,214 (FIG. 3). As shown in FIGS. 1 and 3, the first ends 108,112,208,212 may have a diameter 116,118,216,218, respectively, that is substantially the same as the corresponding stem diameter 22,24.

EXAMPLE 3

Alternatively, it will be appreciated that the diameters may be different (not shown) and/or the first ends may be designed to have any known or suitable alternative geometry and/or size (not shown) other than that which is shown with respect to the non-limiting examples shown and described herein.

EXAMPLE 4

As shown in simplified form in FIG. 3, the second ends 210,214 of the extension members 202,204 of the electrode extension assemblies 200,200', respectively, may have a geometry that is different than the first ends 208,212 of the extension members 202,204.

EXAMPLE 5

Each of the electrode stems 18,20 may be made from a first material, and at least one of the first extension member 102 and the second extension member 104 may be made from a second material, which is different from the first material.

EXAMPLE 6

The second different material of the extension members 102,104 may be aluminum.

EXAMPLE 7

Alternatively, it will be appreciated that the second material may be any known or suitable alternative material, without departing from the scope of the disclosed concept.

EXAMPLE 8

At least one of the first and second extension members 102,104 may be silver plated.

EXAMPLE 9

A method of assembly in accordance with the disclosed concept may include steps of providing a traditional vacuum interrupter 2, providing an electrode extension assembly 100 including a number of extension members 102,104, and welding at least one of the extension members 102,104 to the electrode stem 18,20 of a corresponding one of the contact assemblies 10,12, respectively, on the exterior 8 of the vacuum envelope 4 of the vacuum interrupter 2.

EXAMPLE 10

The assembly method may further include the step of employing a fixture 400 (shown in simplified form in FIG. 2) to suitably position and secure the electrode extensions 102, 104 with respect to the electrode stems 18,20, respectively, to perform the desired welding operation using the aforementioned welder 300 (FIG. 2).

EXAMPLE 11

The steps of employing the fixture 400 and electron or plasma welding may be performed within a vacuum chamber 500 (shown in simplified form in FIG. 2), wherein the welded assembly is removed from the vacuum chamber 500 after successfully welding the electrode extension assemblies 100, 100'.

EXAMPLE 12

The method may optionally further include the step of adding a number of heat sink elements 600 on one, the other, or both of the electrode stems 18,20 (e.g., without limitation, one heat sink element 600 is shown in simplified form in phantom line drawing on stem 18 in FIG. 2). It will be appreciated that such heat sink elements 600 may comprise any known or suitable mechanism or structure (e.g., without limitation, fin; heat pipe; forced air active cooling attachment; water active cooling attachment) for suitably dissipating undesirable excess heat. Specifically, although the thermal effects from electron beam welding are substantially less than other welding methods, the heat sink elements 600 may nonetheless be employed, if desired, to decrease thermal rise and insulate heat radiation created from the welding process. The heat sink elements 600 may be made from any known or suitable material (e.g., without limitation, copper; aluminum), and may be removed after the welding operation has been completed.

EXAMPLE 13

Similarly, a number of thermal management members 700 may be incorporated on one, the other, or both of the extension members 102,104 (e.g., without limitation, one thermal management member 700 is shown in simplified form in phantom line drawing on extension member 104 in FIG. 2). It will be appreciated that such thermal management members 700, like the aforementioned heat sink elements 600, may comprise any known or suitable mechanism or structure (e.g., without limitation, fin; heat pipe; forced air active cooling attachment; water active cooling attachment) for suitably dissipating undesirable excess heat. Specifically, the continuous current that can be carried by a vacuum interrupter is limited by the heat generated by current passing through the interrupter. Use of such thermal management members 700 serves to decrease the thermal rise due to continuous current, which improves the vacuum interrupter. The thermal management members 700 may be made from any known or suitable material (e.g., without limitation, copper; aluminum).

Accordingly, the disclosed vacuum switching apparatus 2 includes a unique electrode extension assembly 100,100', 200,200', wherein a number of extension members 102,104, 202,204 are welded to corresponding electrodes stems 18,20 of the previously assembled and vacuum sealed vacuum switching apparatus 2. That is, the extension members 102, 104,202,204 are welded to the electrode stems 18,20 on the exterior 8 of the vacuum envelope 4. Thus, a wide variety of relatively complex geometries can be added to electrode stems 18,20 and/or existing vacuum switching apparatus 2 can be modified or customized to meet a wide variety of customer demands.

In addition, external electron beam welding in accordance with the disclosed concept, provides the ability to join extension members 102,104,202,204 made from a wide variety of different materials, which materials may be different from the material of the electrode stems 18,20 to which there being welded. This advantage is not possible using conventional vacuum brazing or other vacuum interrupter assembly processes which yield a joint or connection having poor electrical conductivity. Electron beam welding in accordance with the disclosed concept also avoids oxidation of the surface of the electrode stems 18,20 and avoids requirements, such as machining, or chemical or mechanical cleaning after welding, which could damage components of the vacuum interrupter 2 and/or jeopardize the vacuum seal of the vacuum envelope 4 thereof. It will be appreciated, therefore, that the disclosed electrode extension assembly 100,100',200,200' and associated assembly method address and overcome a wide variety of problems associated with the prior art, and significantly expand the utility of vacuum switching apparatus 2 in a wide variety of different applications.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrode extension assembly for a vacuum switching apparatus, said vacuum switching apparatus including a vacuum envelope and separable contact assemblies, the vacuum envelope having an interior and an exterior, each of said contact assemblies including a contact disposed in the interior and an electrode stem extending outwardly from said contact to the exterior, said electrode extension assembly comprising:
   a number of extension members each being joined to the electrode stem of a corresponding one of said contact assemblies by a welded joint on the exterior of the vacuum envelope,
   wherein each electrode stem has a stem diameter,
   wherein each of said extension members has a first end and a second end disposed opposite and distal from the first end, and
   wherein at least the first end has a diameter substantially the same as the stem diameter.

2. The electrode extension assembly of claim 1 wherein said welded joint is formed by electron beam welding or plasma welding.

3. The electrode extension assembly of claim 1 wherein said separable contact assemblies comprise a fixed contact assembly and a movable contact assembly; wherein said number of extension members is a first extension member and a second extension member; wherein said first extension member is welded to the electrode stem of said fixed contact assembly on the exterior of the vacuum envelope; and wherein said second extension member is welded to the electrode stem of said movable contact assembly on the exterior of the vacuum envelope.

4. The electrode extension assembly of claim 3 wherein the electrode stems of said fixed contact assembly and said movable contact assembly each have a stem diameter; wherein each of said first extension member and said second extension member has a first end and a second end disposed opposite and distal from the first end; and wherein at least the first end has a diameter substantially the same as the stem diameter.

5. The electrode extension assembly of claim 4 wherein the second end has a different geometry than the first end.

6. The electrode extension assembly of claim 3 wherein each of the electrode stems is made from a first material; wherein at least one of said first extension member and said second extension member is made from a second material; and wherein the second material is different from the first material.

7. The electrode extension assembly of claim 3 wherein at least one of said first extension member and said second extension member is silver plated.

8. The electrode extension assembly of claim 1 wherein at least one of said extension members includes a number of thermal management members.

9. A vacuum switching apparatus comprising:
   a vacuum envelope having an interior and an exterior;
   separable contact assemblies each including a contact disposed in the interior and an electrode stem extending outwardly from said contact to the exterior; and
   an electrode extension assembly comprising:
      a number of extension members each being joined to the electrode stem of a corresponding one of said contact assemblies by a welded joint on the exterior of the vacuum envelope,
      wherein each electrode stem has a stem diameter,
      wherein each of said extension members has a first end and a second end disposed opposite and distal from the first end, and
      wherein at least the first end has a diameter substantially the same as the stem diameter.

10. The vacuum switching apparatus of claim 9 wherein said welded joint is formed by electron beam welding or plasma welding.

11. The vacuum switching apparatus of claim 9 wherein said separable contact assemblies comprise a fixed contact assembly and a movable contact assembly; wherein said number of extension members is a first extension member and a second extension member; wherein said first extension member is welded to the electrode stem of said fixed contact assembly on the exterior of the vacuum envelope; and wherein said second extension member is welded to the electrode stem of said movable contact assembly on the exterior of the vacuum envelope.

12. The vacuum switching apparatus of claim 11 wherein the electrode stems of said fixed contact assembly and said movable contact assembly each have a stem diameter; wherein each of said first extension member and said second extension member has a first end and a second end disposed opposite and distal from the first end; wherein the first end has a diameter substantially the same as the stem diameter; and wherein the second end has a different geometry than the first end.

13. The vacuum switching apparatus of claim 11 wherein each of the electrode stems is made from a first material; wherein at least one of said first extension member and said second extension member is made from a second material; and wherein the second material is different from the first material.

14. The vacuum switching apparatus of claim 11 wherein at least one of said first extension member and said second extension member includes a number of thermal management members.

15. A method of assembly comprising:
   providing a vacuum switching apparatus including a vacuum envelope and separable contact assemblies, the vacuum envelope having an interior and an exterior, each of said contact assemblies including a contact disposed in the interior and an electrode stem extending outwardly from said contact to the exterior, each electrode stem having a stem diameter,
   providing an electrode extension assembly comprising a number of extension members, each of said extension members having a first end and a second end disposed opposite and distal from the first end, at least the first end having a diameter substantially the same as the stem diameter, and
   welding at least one of said extension members to the electrode stem of a corresponding one of said contact assemblies on the exterior of the vacuum envelope.

16. The method of claim 15 wherein said welding step further comprises employing electron beam welding or plasma welding to form the welded joint between each of said extension members and the electrode stem.

17. The method of claim 16 wherein said welding step further comprises:
   employing a fixture to position said extension members with respect to the electrode stems within a vacuum chamber,
   welding said extension members to the electrode stems, and
   removing the welded assembly from said vacuum chamber.

18. The method of claim 15 wherein said separable contact assemblies comprise a fixed contact assembly and a movable contact assembly; wherein said number of extension members is a first extension member and a second extension member; wherein said first extension member is welded to the electrode stem of said fixed contact assembly on the exterior of the vacuum envelope; and wherein said second extension member is welded to the electrode stem of said movable contact assembly on the exterior of the vacuum envelope.

19. The method of claim 15 wherein said welding step further comprises:
   attaching a number of heat sink elements to at least one of said electrode stems,
   welding said extension members to the electrode stems, and
   removing the number of heat sink elements.

\* \* \* \* \*